United States Patent
Avati et al.

(10) Patent No.: US 9,979,783 B2
(45) Date of Patent: May 22, 2018

(54) DISTRIBUTED COORDINATED SNAPSHOTS

(71) Applicant: Red Hat, Inc., Raleigh, NC (US)

(72) Inventors: Anand Avati, Mountain View, CA (US); Doug Williams, Harvard, MA (US); Shishir Gowda, Mysore (IN)

(73) Assignee: Red Hat, Inc., Raleigh, NC (US)

( * ) Notice: Subject to any disclaimer, the term of this patent is extended or adjusted under 35 U.S.C. 154(b) by 233 days.

(21) Appl. No.: 14/194,265

(22) Filed: Feb. 28, 2014

(65) Prior Publication Data

US 2015/0207875 A1 Jul. 23, 2015

Related U.S. Application Data

(60) Provisional application No. 61/929,956, filed on Jan. 21, 2014.

(51) Int. Cl.
*G06F 15/16* (2006.01)
*H04L 29/08* (2006.01)
*G06F 11/14* (2006.01)

(52) U.S. Cl.
CPC ...... *H04L 67/1095* (2013.01); *G06F 11/1458* (2013.01); *G06F 2201/82* (2013.01); *G06F 2201/84* (2013.01)

(58) Field of Classification Search
CPC ....... H04L 67/1095; G06F 11/00; G06F 11/16
USPC ....................................... 709/203
See application file for complete search history.

(56) References Cited

U.S. PATENT DOCUMENTS

| | | | |
|---|---|---|---|
| 6,173,293 B1 | 1/2001 | Thekkath et al. | |
| 6,594,744 B1* | 7/2003 | Humlicek | G06F 3/0601 |
| | | | 707/999.202 |
| 8,156,080 B2 | 4/2012 | Beck | |
| 8,346,826 B2 | 1/2013 | Torii et al. | |
| 8,689,043 B1* | 4/2014 | Bezbaruah | G06F 11/2058 |
| | | | 711/162 |
| 2004/0153615 A1* | 8/2004 | Koning | G06F 11/1464 |
| | | | 711/162 |
| 2006/0123210 A1* | 6/2006 | Pritchett | G06F 11/1466 |
| | | | 711/162 |
| 2010/0185587 A1 | 7/2010 | Lovinger | |
| 2010/0280996 A1* | 11/2010 | Gross, IV | G06F 11/1451 |
| | | | 707/649 |
| 2011/0313973 A1 | 12/2011 | Srivas et al. | |
| 2012/0303585 A1 | 11/2012 | Zuckerman et al. | |
| 2013/0218840 A1 | 8/2013 | Smith et al. | |
| 2014/0059298 A1* | 2/2014 | Olin | G06F 12/08 |
| | | | 711/135 |

(Continued)

OTHER PUBLICATIONS

Robert Chansler et al., "The Hadoop Distributed File System" http://www.aosabook.org/en/hdfs.html, retrieved on Feb. 5, 2016.

(Continued)

*Primary Examiner* — Nicholas Taylor
*Assistant Examiner* — Meng Vang
(74) *Attorney, Agent, or Firm* — Womble Bond Dickinson (US) LLP; Daniel Ovanezian

(57) ABSTRACT

A management process coordinates a number of servers to create a crash-consistent distributed snapshot. The management process instructs the servers to enter an ambiguity mode in which acknowledgement of barrier operations is delayed, instructs the servers to generate portion snapshots, and instructs the servers to exit the ambiguity mode and acknowledge barrier operations.

20 Claims, 5 Drawing Sheets

(56) References Cited

U.S. PATENT DOCUMENTS

2014/0244952 A1* 8/2014 Raj .................. G06F 3/065
 711/162
2015/0186044 A1* 7/2015 Sharma ............... G06F 3/065
 711/162

OTHER PUBLICATIONS

Jan Stender et al., "Loosely Time-Synchronized Snapshots in Object-Based File Systems" http://www.xtreemfs.org/publications/snapshots-IPCCC.pdf, retrieved on Feb. 5, 2016.

Chandramohan A. Thekkath et al., "Frangipani: A Scalable Distributed File System", http://tim-mann.org/papers/frangipani.pdf, retrieved on Feb. 5, 2016.

Livio B Soares et al., "Meta-Data Snapshotting: A Simple Mechanism for File System Consistency" http://citeseerx.ist.psu.edu/viewdoc/download?doi=10.1.1.2.7416&rep=rep1&type=pdf, retrieved on Feb. 5, 2016.

Antti Kantee "Puffs—Pass-to-Userspace Framework File System" http://eudaemonian.freebsdbrasil.com.br/~eksffa/l/papers/2007.asiabsdcon.org/papers/P04-paper.pdf, retrieved on Feb. 5, 2016.

\* cited by examiner

DISTRIBUTED COORDINATED SNAPSHOTS

CROSS-REFERENCE TO RELATED APPLICATIONS

This application claims priority to U.S. Provisional Patent Application No. 61/929,956, filed Jan. 21, 2014, and hereby incorporated by reference.

TECHNICAL FIELD

Embodiments of the present invention relate to a distributed computing system, and in particular, relates to creating snapshots in a distributed computing system.

DESCRIPTION OF THE RELATED ART

A distributed computing system may include multiple servers and a volume may be spread out across different servers with a portion of the volume stored on each of various servers.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Figure 1:
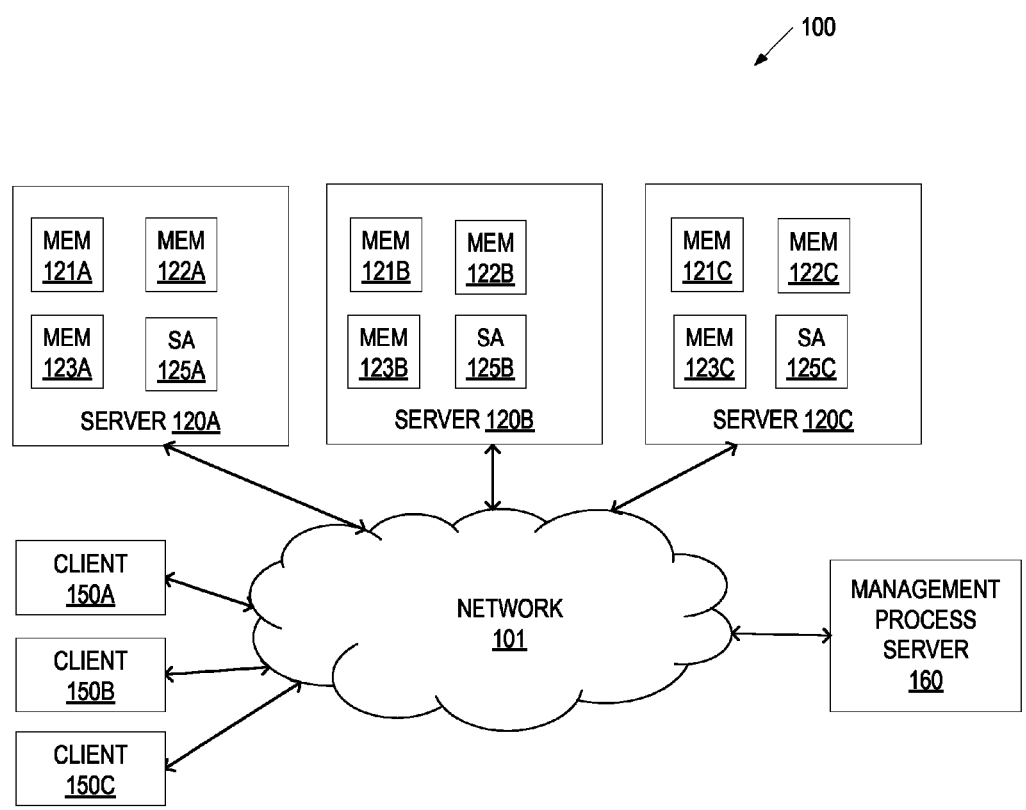
FIG. 1 is a block diagram that illustrates an embodiment of distributed computing system.

Described herein is a method and system for generating a crash-consistent snapshot of a volume in a distributed computing system. A crash-consistent snapshot of a volume is a snapshot of a volume in which no later change to the volume is captured in the snapshot unless all earlier changes are also captured in the snapshot. As such, maintaining a crash-consistent snapshot ensures that if the distributed computing system or any of its servers malfunctions, one is assured that if a change is captured, all earlier changes have also been captured.

As described above, a distributed computing system may include multiple servers and a volume may be spread out across different servers with a portion of the volume stored on each of various servers. Generating a snapshot by transmitting a command to each of the servers storing a portion of a volume to create a portion snapshot of the stored portion may result in portion snapshots being generated at different points in time, capturing some parts of the volume with recent changes and other parts of the volume without recent changes. Thus, the snapshot comprising all of the portion snapshots would not necessarily be crash-consistent.

To generate a crash-consistent snapshot, according to one embodiment, an ambiguity mode command is transmitted to each of the servers storing a portion of a volume. The ambiguity mode command instructs the server to enter an ambiguity mode in which the server delays acknowledgement of barrier operations received from applications. A barrier operation of an application is one which requires an acknowledgement before the application can continue. Examples of barrier operations include sync( ), fsync( ), and flush( ).

Once an ambiguity mode acknowledgement of the ambiguity mode command is received from each of the servers storing a portion of the volume indicating that all of the servers storing a portion of the volume are in the ambiguity mode, a snapshot command is transmitted to each of the servers storing a portion of the volume. The snapshot command instructs the server to generate a portion snapshot of the portion of the volume stored at the server. A snapshot of a volume is a representation of the state of a volume at a particular point in time. A snapshot may be a copy of a volume at a particular point in time. Similarly, a portion snapshot is a representation of the state (e.g., a copy) of the portion of the volume stored on a single server at a particular point in time.

Once a snapshot acknowledgement of the snapshot command is received from each of the servers storing a portion of the volume indicating that all of the servers storing a portion of the volume have generated a portion snapshot, a "normal" mode command is transmitted to each of the servers storing a portion of the volume. Whereas in the ambiguity mode, the servers delay acknowledgement of barrier operations, in the normal mode, the servers do not delay acknowledgement of barrier operations. Thus, the normal mode command instructs a server to exit the ambiguity mode and to acknowledge barrier operations received from applications.

Accordingly, aspects of the present disclosure provide a crash-consistent snapshot in a distributed computing environment.

FIG. 1 is a block diagram that illustrates an embodiment of a distributed computing system 100. The distributed computing system 100 includes a plurality of clients 150A-150C connected to a network 101. Each of the clients 150A-150C may execute one or more applications. The distributed computing system 100 includes a plurality of servers 120A-120C also connected to the network 101, each of the servers storing a portion of a volume. The distributed computing system 100 may also include other servers (not shown) storing portions of other volumes. Each of the plurality of servers 120A-120C includes three memories: a persistent storage 121A-121C, a buffer storage 122A-122C, and a back-up storage 123A-123C. Although illustrated and described separately, the three memories may be embodied as one, two, three, or more memory devices.

Although FIG. 1 illustrates three clients 150A-150C and three servers 120A-120C, it is to be appreciated that the distributed computing system 100 may include any number of clients and may include any number of servers. In particular, the distributed computing system 100 may include less than three servers 120A-120C storing portions of a volume or more than three server 120A-120C storing portions of a volume.

Each of the servers 120A-120C stores a portion of a volume in the persistent storage 121A-121C. The volume may include one or more files. The volume may include metadata regarding the files, such as an inode or directory block. The clients 150A-150C (or applications running on the clients 150A-150C) may transmit changes to the volume (write, additions, deletions, updates, etc.) over the network 101 and the changes may be stored in the buffer storage 122A-122C before being committed to the persistent storage 121A-121C. The changes may be committed in response to a barrier command such as sync, fsync, flush, or any other barrier command. When a portion snapshot is created, the portion snapshot may be stored in the back-up storage 123A-123C.

The distributed computing system 100 includes a management process server 160 that coordinates with the servers 120A-120C, e.g. snapshot agents 125A-125C of the servers 120A-120C, to generate a distributed crash-consistent snapshot as described below. Although illustrated separately, the management process server 160 may be embodied in a separate device coupled to the network 101, one of the servers 120A-120C, another server storing other volumes, or one of the clients 150A-150C.

Figure 2:
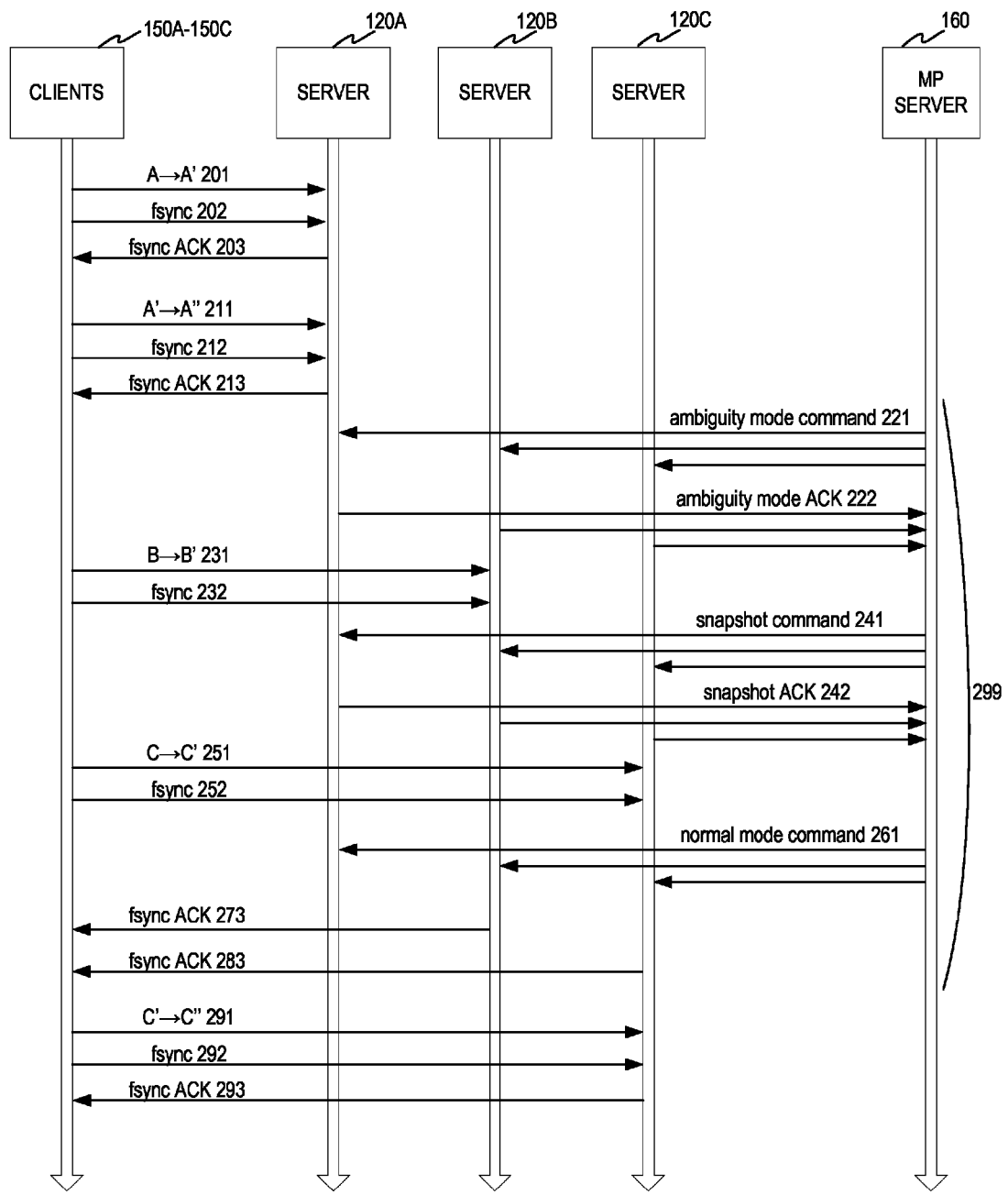
FIG. 2 is a communication timing diagram that illustrates generation of a snapshot of a volume according to one embodiment.

FIG. 2 is a communication timing diagram that illustrates generation of a snapshot of a volume according to one embodiment. At a first time, the first client 150A (or an application running on the first client 150A) transmits a change 201 to a first server 120A storing a first portion of a volume. The change 201 indicates that the first portion of the volume is to be changed from a first state (A) to a second state (A'). The change 201 may include a change to a file or to metadata. The change 201 may include a write, an update, an addition, a deletion, or any other change to the first portion of the volume. Following the change 201, the first client 150A transmits an fsync command 202 (or any other barrier operation) to the first server 120A. In response to receiving the fsync command 202, the first server 120A commits the change 201 to persistent storage and transmits an fsync acknowledgement 203 to the first client 150A.

Upon receiving the fsync acknowledgement 203 and not before receiving the fsync acknowledgement 203, the first client 150A may transmit another change 211 to the first server 120A. The change 211 indicates that the first portion of the volume is to be changed from the second state (A') to a third state (A"). Following the change 211, the first client 150A transmits another fsync command 212 to the first server 120A. In response to receiving the fsync command 212, the first server 120A commits the change 211 to persistent storage and transmits an fsync acknowledgement 213 to the first client 150A.

At this point, it is decided to begin a coordinated snapshot process 299 to generate a snapshot of the volume. The management process server 160 may decide to take a snapshot of the volume based on a time of day, e.g., to periodically take snapshots, or based on a received request to take snapshot from one of the clients 150A-150C, one of the servers 120A-120C, or any other source.

To begin the coordinated snapshot process 299, the management process server 160 identifies each server storing a portion of the volume for which the snapshot is to be generated. With respect to FIG. 2, the management process server 160 identifies a first server 120A storing a first portion of the volume, a second server 120B storing a second portion of the volume, and a third server 120C storing a third portion of the volume.

The management process server 160 transmits an ambiguity mode command 221 to each of the identified servers 120A-120C. The ambiguity mode command instructs the servers 120A-120C to enter an ambiguity mode in which the server delays acknowledgement of barrier operations, including fsync, received from clients 150A-150C (or applications running on the clients 150A-150C).

In response to the receiving the ambiguity mode command 221, each of the servers 120A-120C enters the ambiguity mode and transmits an ambiguity mode acknowledgement 222 back to the management process server 160.

Server 120B is in ambiguity mode when a change 231 is received from the second client 150B. The change 231 indicates that the second portion of the volume is to be changed from the first state (B) to a second state (B'). Following the change 231, the second client 150B transmits an fsync command 232 to the second server 120B.

As noted above, when a server is in the ambiguity mode, the server delays acknowledgement of barrier operations received from clients 150A-150C. Thus, in response to receiving the fsync command 232, the second server 120B commits the change 231 to persistent storage (similar to the response of the first server 120A to change 211), but does not transmit an fsync acknowledgement (different from the response of the first server 120A to change 211).

Once the management process server 160 has received an ambiguity mode acknowledgement 222 from all of the servers 120A-120C, the management process server 160 transmits a snapshot command 241 to each of the servers 120A-120C. The snapshot command 241 instructs the servers 120A-120C to generate a portion snapshot of the portion of the volume stored by the server.

In response to receiving the snapshot command 241, each of the servers 120A-120C generates a portion snapshot of the portion of the volume stored by the server and transmits an snapshot acknowledgement 242 back to the management process server 160. The servers 120A-120C may each generate a portion snapshot by copying the portion of the volume from persistent storage to a back-up storage. The servers 120A-120C may optionally flush a buffer storage to persistent storage (as in response to a fsync command) open receiving the snapshot command 241 before generating the portion snapshot.

Thus, the first server 120A generates a first portion snapshot capturing the third state (A") of the first portion of the volume, the second server 120B generates a second portion snapshot capturing the second state (B') of the second portion of the volume, and the third server 120C generates a third portion snapshot capturing an unchanged first state (C) of the third portion of the volume.

While still in the ambiguity mode, but after generating the third portion snapshot, the third server 120C receives a change 251 from the third client 150C. The change 251 indicates that the third portion of the volume is to be changed from the first state (C) to a second state (C'). Following the change 250, the third client 150C transmits an fsync command 252 to the third server 120C.

In response to receiving the fsync command 252, the third server 120C commits the change 231 to persistent storage (similar to the response to change 211 and 231), but does not transmit an fsync acknowledgement (different from the response to change 211, but similar to the response to change 231).

Once the management process server 160 has received a snapshot acknowledgement 242 from all of the servers 120A-120C, the management process server 160 transmits a normal mode command 261 to each of the servers 120A-120C. The normal mode command 261 instructs the servers 120A-120C to exit the ambiguity mode (e.g., enter a normal mode) and acknowledge barrier operations received from the clients 150A-150C.

In response to receiving the normal mode command 261, each of the servers 120A-120C exits the ambiguity mode and acknowledges barrier operations received from the clients 150A-150C. The servers 120A-120C may options transmit a normal mode acknowledgement (not shown) to the management process server indicating that the server has returned to a normal mode or exited the ambiguity mode.

Upon exiting the ambiguity mode, after having received the normal mode command 261, the servers 120A-120C acknowledge barrier operations that have been received since entering the ambiguity mode. Thus, the second server 120B acknowledges the fsync 232 from the second client 150B with an fsync acknowledgement 273 and the third server 120C acknowledges the fsync 252 from the third client 150C with an fsync acknowledgement 283.

The coordinated snapshot process 299 having completed, and the third client 150C having received an fsync acknowledgement 283, the third client 150C transmits a change 291 to the third server 120C. The change 291 indicates that the third portion of the volume is to be changed from the second state (C') to a third state (C"). Following the change 291, the third client 150C transmits an fsync command 292 to the third server 150C.

Because the third server 150C is no longer in the ambiguity mode, the third server 150C responds to the fsync command 292 by committing the change 291 to persistent storage and transmitting an fsync acknowledgement 293 to the third client 150C.

The snapshot comprising the portion snapshots is crash-consistent. In particular, each change 201, 211, 231, 251, 291 is captured only if earlier changes are also captured. All changes received before the snapshot process 299 (e.g., change 201 and change 211) are captured. All changes received after the snapshot process 299 (e.g., change 291) are not captured. Changes received during the snapshot process 299 (e.g., change 231 and change 251), while the servers 120A-120C are in the ambiguity mode, may or may not be captured depending on when the change is received with respect to the snapshot command 241. Thus, change 231 is captured by the snapshot, but change 251 is not captured.

Figure 3:
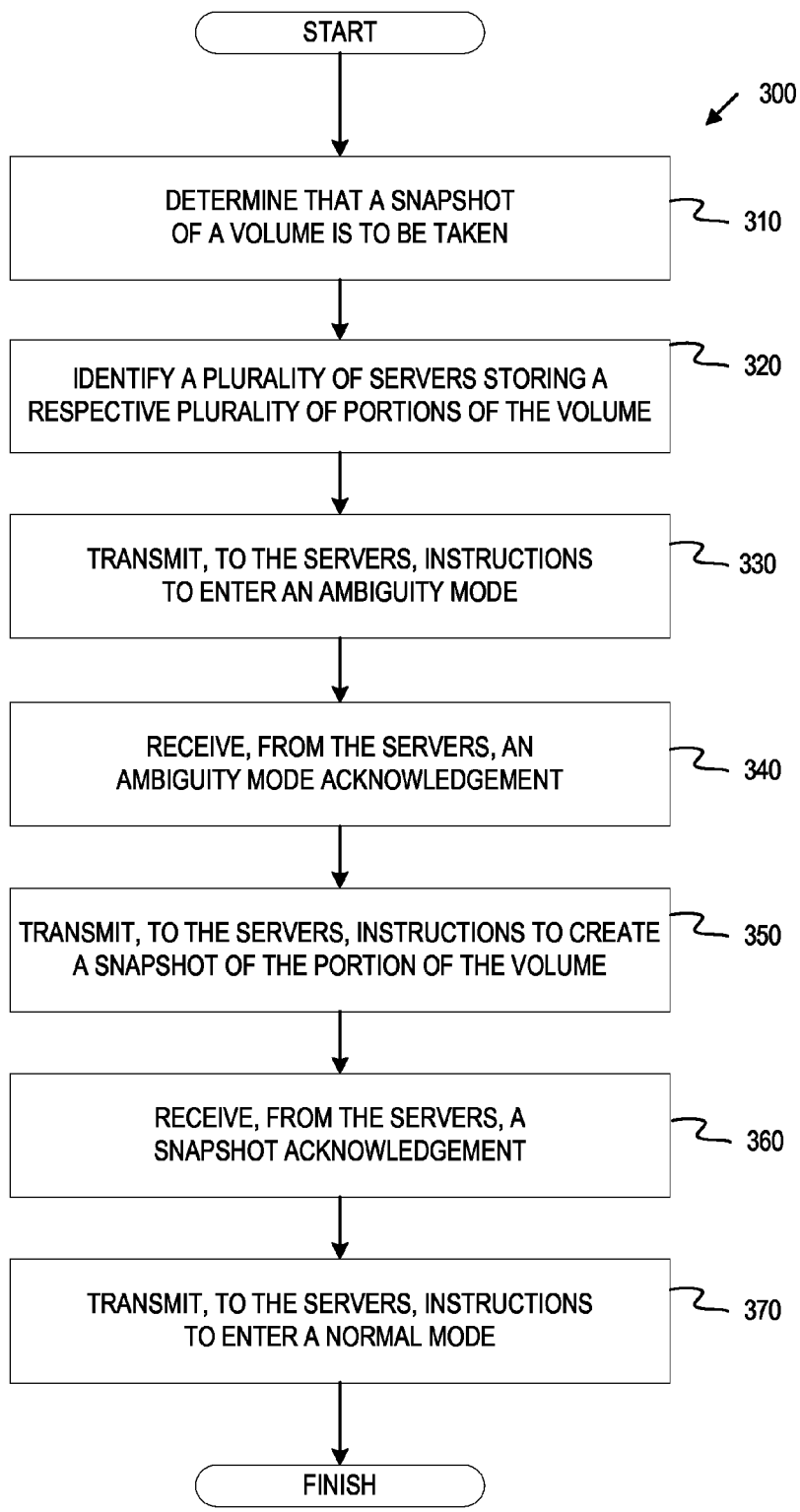
FIG. 3 is a flow diagram that illustrates an embodiment of a method of instructing a plurality of servers to generate a snapshot of a volume.

FIG. 3 is a flow diagram that illustrates an embodiment of a method 300 of instructing a plurality of servers to generate a snapshot of a volume. The method 300 may be performed by processing logic that may include hardware (e.g., circuitry, dedicated logic, programmable logic, microcode, etc.), software (e.g., instructions executed by a processing device), firmware, or a combination thereof. For example, method 300 may be performed by the management process server 160 of FIG. 1.

At block 310 of method 300, the processing logic determines that a snapshot of a volume is to be taken. The processing logic may determine that a snapshot of a volume is to be taken at a particular time based on a predetermined schedule. The processing logic may determine that a snapshot of a volume is to be taken based on a received request or command to generate a snapshot of the volume.

At block 320, the processing logic identifies a plurality of servers storing a respective plurality of portions of the volume. The processing logic may identify the plurality of servers by accessing a data structure that correlates each of one or more volume identifiers with one or more server identifiers. The data structure may be a volume/server table or other data structure. The processing logic may identify the plurality of servers by querying each a set of servers to determine if the server includes a portion of the volume. Thus, the processing logic may transmit a query to each of a set of servers asking if the server includes a portion of particular volume (which may be identified by including a volume identifier in the query) and may receive a positive response from each of a plurality of servers.

At block 330, the processing logic transmits instructions to each of the identified servers instructing them to enter an ambiguity mode. As described above, a server in the ambiguity mode delays acknowledgement of barrier operations. The instructions may include an ambiguity mode command as described above.

At block 340, the processing logic receives an ambiguity mode acknowledgement from each of the servers indicating that the server has entered the ambiguity mode. The ambiguity mode acknowledgement may also include a time at which server entered the ambiguity mode.

If the processing logic fails to receive an ambiguity mode acknowledgement from each of the servers within a specific time, the processing logic may resend the ambiguity mode instructions to those servers that did not respond with an ambiguity mode acknowledgement. If this also fails, the processing logic may abort the method 300, transmitting normal mode commands (described further below with respect to block 370) to servers from which ambiguity mode acknowledgements were received. If the method 300 was begun in response to receiving a snapshot request, the processing logic may transmit a fail message to the requestor in response to aborting the method 300.

At block 350, in response to receiving an ambiguity mode acknowledgement from all the identified servers, the processing logic transmits instructions to the servers to create a portion snapshot of the portion of the volume stored by the server. The instructions may include a snapshot command as described above. The generated snapshot comprising the plurality of portion snapshots may be crash-consistent. Thus, the transmitted instructions may include instructions to create a crash-consistent snapshot.

The instructions to create a portion snapshot may include instructions to commit buffered writes to the portion of the volume stored by the server to persistent storage of the server and instructions to create a snapshot of the portion of the volume stored in the persistent storage. Alternatively, the instructions to create a portion snapshot may include instructions to create a snapshot of the portion of the volume stored in the persistent storage without first committing buffered writes.

At block 360, the processing logic receives a snapshot acknowledgement from each of the servers indicating that the server has generated a portion snapshot of the portion of the volume stored by the server. The snapshot acknowledgement may also include a time at which server generated the portion snapshot. The times at which two different servers generated their respective portion snapshots may be different.

If the processing logic fails to receive a snapshot acknowledgement from each of the servers within a specific time, the processing logic may resend the snapshot instructions to those servers that did not respond with a snapshot acknowledgement. If this also fails, the processing logic may abort the method 300, transmitting normal mode commands (described further below with respect to block 370) to all the servers (irrespective of whether a snapshot acknowledgement was received from the server). If the method 300 was begun in response to receiving a snapshot request, the processing logic may transmit a fail message to the requestor in response to aborting the method 300.

At block 370, in response to receiving a snapshot acknowledgement from all the identified servers, the processing logic transmits instructions to the servers to exit the ambiguity mode and enter a normal mode. As described above, a server in the normal mode acknowledges barrier operations. The instructions may include a normal mode command as described above. The method 300 may further include receiving normal mode acknowledgements from the servers indicating that the server has exited the ambiguity mode. The method 300 may further include resending the normal mode instructions to a server if a normal mode acknowledgement is not received from the server. If the method 300 was begun in response to receiving a snapshot request, the processing logic may transmit a success message to the requestor in response to completing the method 300.

Figure 4:
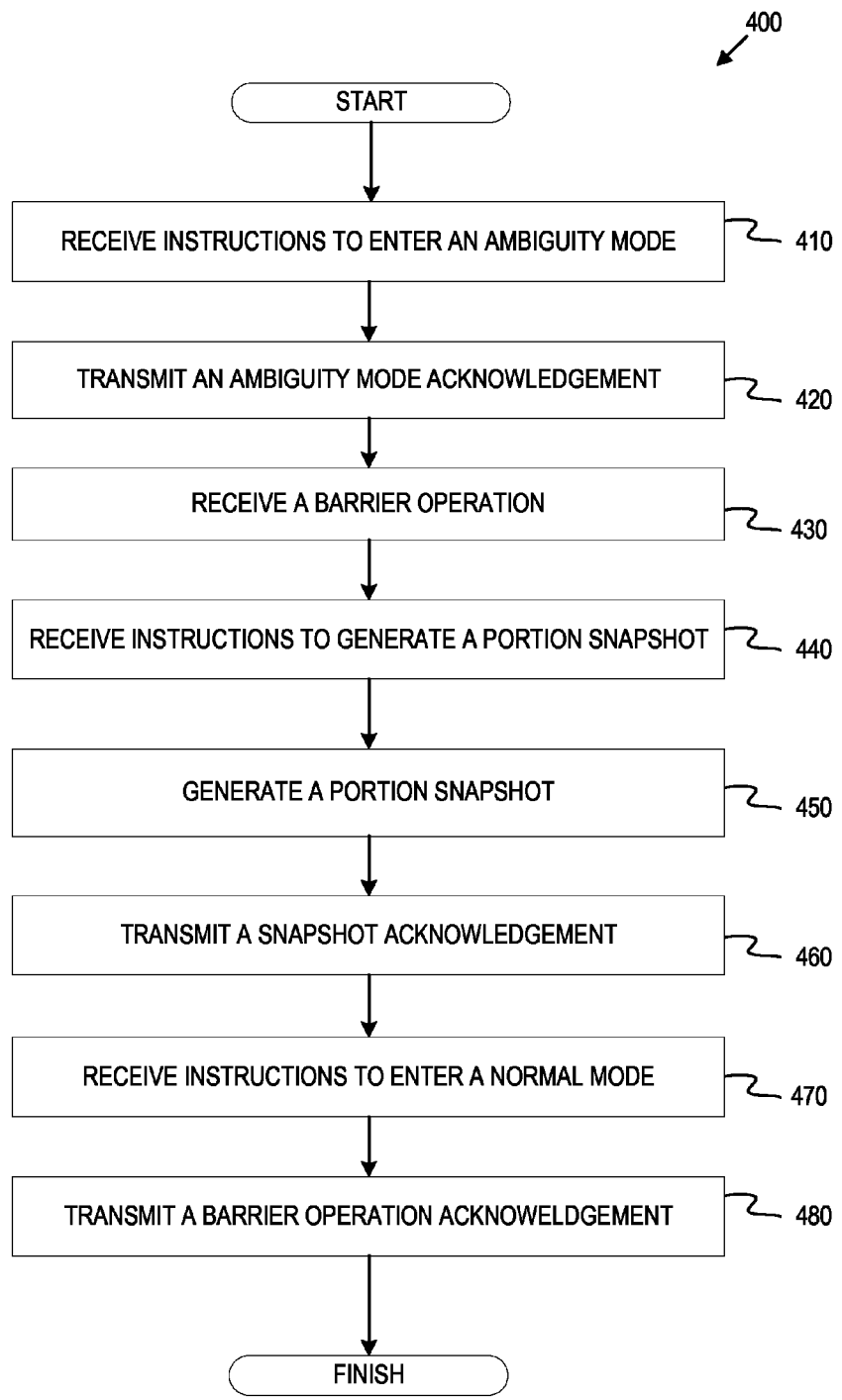
FIG. 4 is a flow diagram that illustrates an embodiment of a method of generating a portion of a coordinated snapshot of a volume.

FIG. 4 is a flow diagram that illustrates an embodiment of a method 400 of generating a portion of a coordinated snapshot of a volume. The method 400 may be performed by processing logic that may include hardware (e.g., circuitry, dedicated logic, programmable logic, microcode, etc.), software (e.g., instructions executed by a processing device), firmware, or a combination thereof. For example, method 400 may be performed by one or more of the servers 120A-120C of FIG. 1. In particular, the method 400 may be performed by one or more of the snapshot agents 125A-125C of the servers 120A-120C of FIG. 1.

At block 410 of method 400, the processing logic receives instructions to enter an ambiguity mode. The instructions may be received from a management process executing on a management process server or any other device. As described above, a server in the ambiguity mode delays acknowledgement of barrier operations received from clients or applications. Thus, a server in ambiguity mode does not acknowledge a barrier operation until the server exits the ambiguity mode. At block 420, the processing logic transmits an ambiguity mode acknowledgement.

At block 430, the processing logic receives a barrier operation. The barrier operation may be received from an application running on a client or any other device. Because the processing logic has entered the ambiguity mode, the processing logic delays acknowledgement of the barrier operation (until block 480 below). However, the processing logic may perform the barrier operation without acknowledging that it has performed the barrier operation. For example, in response to receiving the barrier operation, the processing logic may commit buffered writes to persistent storage.

At block 440, the processing logic receives instructions to generate a portion snapshot of a volume. The instructions may be received from a management process. At block 450, in response to receiving the instructions to generate a portion snapshot of a volume, the processing logic generates a portion snapshot of the volume. The portion snapshot may a portion of a crash-consistent snapshot. At block 460, the processing logic transmits a snapshot acknowledgement indicating that the portion snapshot has been generated.

At block 470, the processing logic receives instructions to exit the ambiguity mode and enter a normal mode. In the normal mode, a server acknowledges barrier operations. At block 480, in response to receiving the instructions to exit the ambiguity mode in block 470 (and in response to receiving the barrier operation in block 430), the processing logic transmits a barrier operation acknowledgement. The processing logic may transmit the barrier operation acknowledgement to the application, client, or device from which the barrier operation was received.

Figure 5:
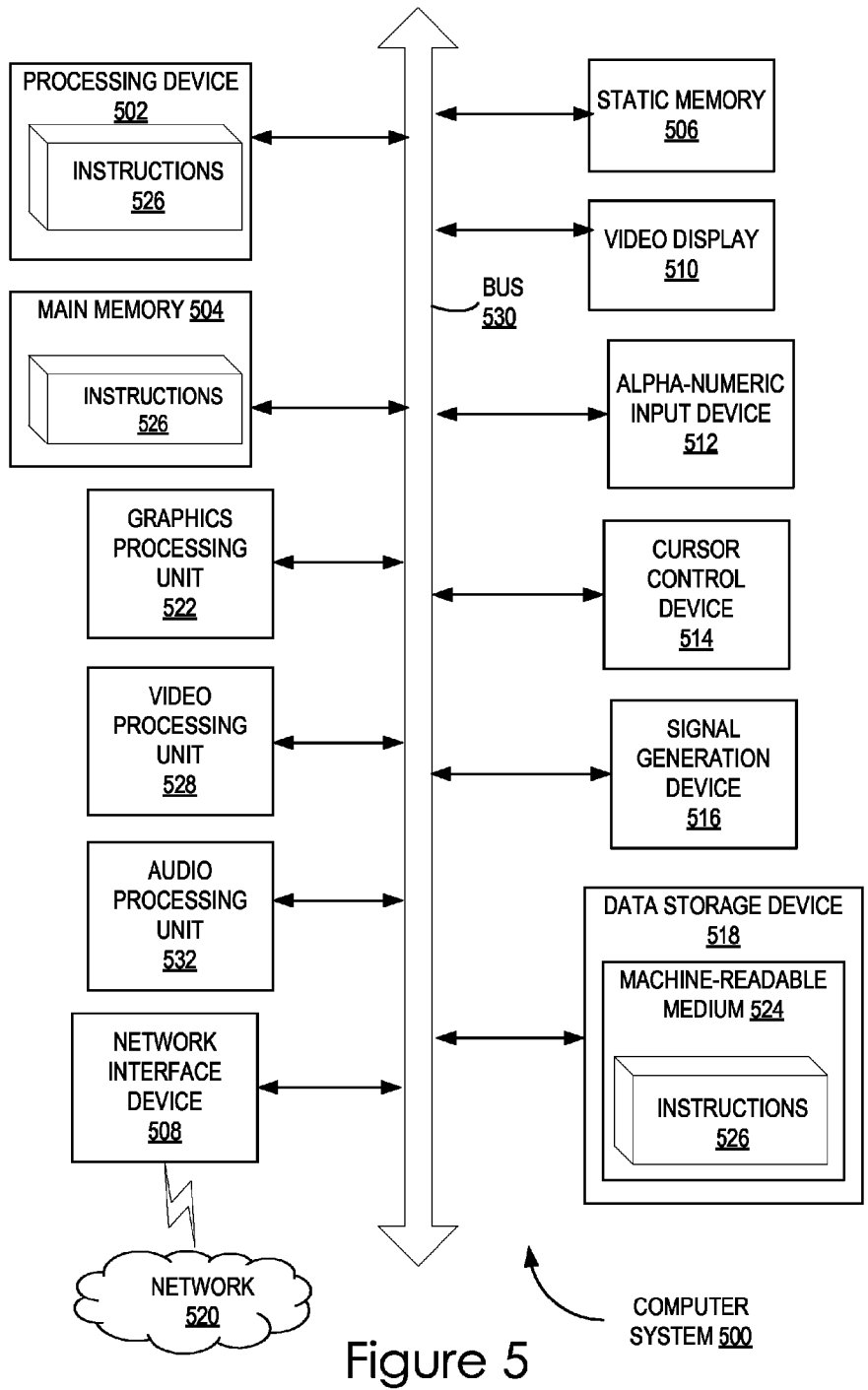
FIG. 5 illustrates a diagrammatic representation of a machine in the exemplary form of a computer system.

FIG. 5 illustrates a diagrammatic representation of a machine in the exemplary form of a computer system 500 within which a set of instructions, for causing the machine to perform any one or more of the methodologies discussed herein, may be executed. The computer system 500 may correspond to one of the clients 150A-150C, one of the servers 120A-120C, or the management process server 160 of FIG. 1. In embodiments of the present invention, the machine may be connected (e.g., networked) to other machines (e.g., other components of the distributed computing system 100) in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 516 (e.g., a data storage device), which communicate with each other via a bus 508.

The processing device 502 represents one or more general-purpose processors such as a microprocessor, central processing unit, or the like. The term "processing device" is used herein to refer to any combination of one or more integrated circuits and/or packages that include one or more processors (e.g., one or more processor cores). Therefore, the term processing device encompasses a single core CPU (computer processing unit), a multi-core CPU and a massively multi-core system that includes many interconnected integrated circuits, each of which may include multiple processor cores. The processing device 502 may therefore include multiple processors. The processing device 502 may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 502 may also be one or more special-purpose processing devices such as an application specific integrated circuit (ASIC), a field programmable gate array (FPGA), a digital signal processor (DSP), network processor, system on chip (SoC), or the like. The computer system 500 may include a graphics processing unit 522, a video processing unit 528, and an audio processing unit 532.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The secondary memory 518 may include a machine-readable storage medium (or more specifically a computer-readable storage medium) 524 on which is stored one or more sets of instructions 526 embodying any one or more of the methodologies or functions described herein (e.g., cache system 100). The instructions 526 may also reside, completely or at least partially, within the main memory 504 and/or within the processing device 502 during execution thereof by the computer system 500, the main memory 504 and the processing device 502 also constituting machine-readable storage media.

While the computer-readable storage medium 524 is shown in an exemplary embodiment to be a single medium, the term "computer-readable storage medium" (or "computer-readable medium") should be taken to include a single medium or multiple media (e.g., a centralized or distributed database, and/or associated caches and servers) that store the one or more sets of instructions. The term "computer-readable storage medium" shall also be taken to include any medium other than a carrier wave that is capable of storing or encoding a set of instructions for execution by the machine that cause the machine to perform any one or more of the methodologies of the present invention. The term "computer-readable storage medium" shall accordingly be taken to include, but not be limited to, non-transitory media such as solid-state memories, and optical and magnetic media.

The modules, components and other features described herein (for example in relation to FIG. 1) can be implemented as discrete hardware components or integrated in the functionality of hardware components such as ASICS, FPGAs, DSPs, SoCs, or similar devices. In addition, the modules can be implemented as firmware or functional circuitry within hardware devices. Further, the modules can be implemented in any combination of hardware devices and software components, or only in software.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "adding", "receiving", "determining", "routing", "performing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The terms "first", "second", "third", "fourth", etc. as used herein are meant as labels to distinguish among different elements and may not necessarily have an ordinal meaning according to their numerical designation.

Embodiments of the present invention also relate to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description above. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
   identifying a plurality of servers storing a respective plurality of portions of a volume;
   transmitting, by a processing device to each of the plurality of servers, instructions to enter an ambiguity mode in which each of one or more of the plurality of servers performs a first corresponding barrier operation received from an application and delays transmitting acknowledgement of the first corresponding barrier operation, wherein the application is prevented from transmitting additional barrier operations to the one or more of the plurality of servers until the application receives the acknowledgement of the first corresponding barrier operation, wherein a plurality of barrier operations comprises the first corresponding barrier operation for each of the one or more of the plurality of servers;
   receiving, from each of the plurality of servers, an ambiguity mode acknowledgement indicating that a respective server has entered the ambiguity mode;
   transmitting, to each of the plurality of servers in response to the receiving the ambiguity mode acknowledgement from each of the plurality of servers, a snapshot command comprising instructions to create a portion snapshot of a corresponding portion of the volume stored by the respective server;

receiving, from each of the plurality of servers, a snapshot acknowledgement indicating that the respective server has created a portion snapshot of the corresponding portion of the volume stored by the respective server, wherein the portion snapshot captures changes to the corresponding portion of the volume in view of a first portion of the plurality of barrier operations received from the application before the respective server receives the snapshot command;

transmitting, to each of the plurality of servers in response to the receiving the snapshot acknowledgement from each of the plurality of servers, instructions to enter a normal mode in which the respective server transmits the acknowledgement of the barrier operation received from the application and performed by the respective server; and receiving, from each of the plurality of servers, a normal mode acknowledgment indicating that the server has returned to the normal mode or exited the ambiguity mode.

2. The method of claim 1, wherein the identifying the plurality of servers comprises identifying every server storing a portion of the volume.

3. The method of claim 1, wherein the receiving, from each of the plurality of servers, the snapshot acknowledgement comprises receiving a plurality of snapshot acknowledgements indicating that portion snapshots have been taken at a plurality of different times.

4. The method of claim 1, wherein the transmitting the instructions to create the portion snapshot comprises transmitting instructions to create a crash-consistent snapshot.

5. The method of claim 1, wherein the transmitting the instructions to create the portion snapshot comprises transmitting instructions to commit buffered writes to the corresponding portion of the volume stored by the respective server to persistent storage of the respective server and to create a snapshot of the corresponding portion of the volume stored in the persistent storage of the respective server.

6. A non-transitory computer-readable medium having instructions encoded thereon which, when executed by a processing device, cause the processing device to:

identify a plurality of servers storing a respective plurality of portions of a volume;

transmit, by the processing device to each of the plurality of servers, instructions to enter an ambiguity mode in which each of the one or more of the plurality of servers performs a first corresponding barrier operation received from an application and delays transmitting acknowledgement of the first corresponding barrier operation, wherein the application is prevented from transmitting additional barrier operations to the one or more of the plurality of servers until the application receives the acknowledgement of the first corresponding barrier operation, wherein a plurality of barrier operations comprises the first corresponding barrier operation for each of the one or more of the plurality of servers;

receive, from each of the plurality of servers, an ambiguity mode acknowledgement indicating that a respective server has entered the ambiguity mode;

transmit, to each of the plurality of servers in response to the receiving the ambiguity mode acknowledgement from each of the plurality of servers, a snapshot command comprising instructions to create a portion snapshot of a corresponding portion of the volume stored by the respective server;

receive, from each of the plurality of servers, a snapshot acknowledgement that the respective server has created a portion snapshot of the corresponding portion of the volume stored by the respective server, wherein the portion snapshot captures changes to the corresponding portion of the volume in view of a first portion of the plurality of barrier operations received from the application before the respective server receives the snapshot command;

transmit, to each of the plurality of servers in response to the receiving the snapshot acknowledgement from each of the plurality of servers, instructions to enter a normal mode in which the respective server transmits the acknowledgement of the barrier operation received from the application and performed by the respective server; and receive, from each of the plurality of servers, a normal mode acknowledgment indicating that the server has returned to the normal mode or exited the ambiguity mode.

7. The non-transitory computer-readable medium of claim 6, wherein to identify the plurality of servers, the processing device is to identify every server storing a portion of the volume.

8. The non-transitory computer-readable medium of claim 6, wherein to receive, from each of the plurality of servers, the snapshot acknowledgement, the processing device is to receive a plurality of snapshot acknowledgements indicating that portion snapshots have been taken at a plurality of different times.

9. The non-transitory computer-readable medium of claim 6, wherein to transmit the instructions to create the portion snapshot, the processing device is to transmit instructions to create a crash-consistent snapshot.

10. The non-transitory computer-readable medium of claim 6, wherein to transmit instructions to create the portion snapshot, the processing device is to transmit instructions to commit buffered writes to the corresponding portion of the volume stored by the respective server to persistent storage of the respective server and to create a portion snapshot of the corresponding portion of the volume stored in the persistent storage of the respective server.

11. A method comprising:

receiving instructions to enter an ambiguity mode;

receiving instructions to enter a normal mode, wherein after the receiving of the instructions to enter the ambiguity mode and before the receiving of the instructions to enter the normal mode:

receiving a barrier operation from an application;

performing, by a processing device of a server, the barrier operation in response to the receiving the barrier operation;

delaying transmission of an acknowledgement of the barrier operation to the application, wherein the application is prevented from transmitting additional barrier operations to the server until the application receives the acknowledgement of the barrier operation;

receiving a snapshot command comprising instructions to create a portion snapshot of a portion of a volume stored by the server; and creating the portion snapshot, wherein the portion snapshot captures changes to the portion of the volume in view of the barrier operation, wherein the barrier operation is received from the application before the receiving of the snapshot command;

transmitting, in response to receiving the instructions to enter the normal mode, a normal mode acknowledgment indicating that the server has returned to the normal mode or exited the ambiguity mode; and transmitting, in response to the receiving the instructions to enter the normal mode, the acknowledgement of the barrier operation to the application.

12. The method of claim 11, further comprising transmitting an ambiguity mode acknowledgement indicating that the instructions to enter the ambiguity mode have been received.

13. The method of claim 11, further comprising committing buffered writes to persistent storage in response to performing the barrier operation.

14. The method of claim 11, further comprising, after the receiving of the instructions to enter the ambiguity mode and before receiving of the instructions to enter the normal mode, transmitting a snapshot acknowledgement that the portion snapshot has been created.

15. The method of claim 14, wherein the portion snapshot is a portion of a crash-consistent snapshot.

16. A system comprising:
a memory;
a processing device of a server, operatively coupled to the memory, the processing device to:
  receive instructions to enter an ambiguity mode;
  receive instructions to enter a normal mode, wherein, after receiving the instructions to enter the ambiguity mode and before receiving the instructions to enter the normal mode, the processing device to:
    receive a barrier operation from an application;
    perform, by the processing device, the barrier operation in response to receiving the barrier operation;
    delay transmission of an acknowledgement of the barrier operation to the application, wherein the application is prevented from transmitting additional barrier operations to the server until the application receives the acknowledgement of the barrier operation;
    receive a snapshot command comprising instructions to create a portion snapshot of a portion of a volume stored by the server; and
    create the portion snapshot, wherein the portion snapshot captures changes to the portion of the volume in view of the barrier operation, wherein the barrier operation is received from the application before the receiving of the snapshot command;
  transmit, in response to receiving the instructions to enter the normal mode, a normal mode acknowledgment indicating that the server has returned to the normal mode or exited the ambiguity mode; and
  transmit, in response to receiving the instructions to enter the normal mode, the acknowledgement of the barrier operation to the application.

17. The system of claim 16, wherein the processing device is further to commit buffered writes to persistent storage in response to the barrier operation.

18. The system of claim 16, wherein the processing device is further to transmit an ambiguity mode acknowledgement indicating that the instructions to enter the ambiguity mode have been received.

19. The system of claim 16, wherein the processing device is further to, after the receiving the instructions to enter the ambiguity mode and before receiving the instructions to enter the normal mode, transmit a snapshot acknowledgement that the portion snapshot has been created.

20. The system of claim 19, wherein the portion snapshot is a portion of a crash-consistent snapshot.

* * * * *